United States Patent
Tu et al.

(10) Patent No.: US 11,244,108 B2
(45) Date of Patent: Feb. 8, 2022

(54) TRANSLATION METHOD AND APPARATUS

(71) Applicant: HUAWEI TECHNOLOGIES CO., LTD., Guangdong (CN)

(72) Inventors: Zhaopeng Tu, Shenzhen (CN); Longyue Wang, Dublin (IE); Jinhua Du, Dublin (IE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 92 days.

(21) Appl. No.: 16/452,439

(22) Filed: Jun. 25, 2019

(65) Prior Publication Data
US 2019/0311038 A1   Oct. 10, 2019

Related U.S. Application Data

(63) Continuation of application No. PCT/CN2017/112384, filed on Nov. 22, 2017.

(30) Foreign Application Priority Data

Feb. 22, 2017 (CN) .......................... 201710097655.9

(51) Int. Cl.
*G06F 40/20* (2020.01)
*G06F 40/237* (2020.01)
(Continued)

(52) U.S. Cl.
CPC .......... *G06F 40/237* (2020.01); *G06F 40/295* (2020.01); *G06F 40/30* (2020.01);
(Continued)

(58) Field of Classification Search
CPC .......... G06F 40/58; G06F 40/20; G06F 40/30; G06F 40/40; G06F 40/51; G06F 40/295; G06F 40/45; G06F 40/47; G06K 9/6256
See application file for complete search history.

(56) References Cited

U.S. PATENT DOCUMENTS

2003/0191626 A1* 10/2003 Al-Onaizan .......... G06F 40/295
                                                              704/8
2008/0172673 A1*  7/2008 Naik .................... G06F 9/5083
                                                              718/104
(Continued)

FOREIGN PATENT DOCUMENTS

CN         101251840    *    8/2008
CN         101251840 A      8/2008
(Continued)

OTHER PUBLICATIONS

Machine translation for CN 101419592, IDS (Year: 2007).*
(Continued)

*Primary Examiner* — Qian Yang
(74) *Attorney, Agent, or Firm* — Womble Bond Dickinson (US) LLP

(57) ABSTRACT

Embodiments of the present invention provide a translation method and apparatus, and relate to the field of machine translation. The method includes: obtaining a to-be-translated sentence, where the to-be-translated sentence is a sentence expressed in a first language; determining a first named entity set in the to-be-translated sentence, and an entity type of each first named entity in the first named entity set; determining, based on the first named entity set and the entity type of each first named entity, a second named entity set expressed in a second language; determining a source semantic template of the to-be-translated sentence, and obtaining a target semantic template corresponding to the source semantic template from a semantic template correspondence; and determining a target translation sentence based on the second named entity set and the target semantic template.

18 Claims, 7 Drawing Sheets

(51) Int. Cl.
    *G06K 9/62*     (2006.01)
    *G06F 40/58*     (2020.01)
    *G06F 40/30*     (2020.01)
    *G06F 40/40*     (2020.01)
    *G06F 40/51*     (2020.01)
    *G06F 40/295*     (2020.01)

(52) U.S. Cl.
    CPC .............. *G06F 40/40* (2020.01); *G06F 40/51* (2020.01); *G06F 40/58* (2020.01); *G06K 9/6256* (2013.01)

(56) References Cited

U.S. PATENT DOCUMENTS

| | | | |
|---|---|---|---|
| 2009/0094018 | A1 | 4/2009 | Hu et al. |
| 2010/0179803 | A1* | 7/2010 | Sawaf ................... G06F 40/40 704/2 |
| 2011/0119243 | A1 | 5/2011 | Diamond et al. |
| 2013/0124545 | A1 | 5/2013 | Holmberg et al. |
| 2013/0173247 | A1 | 7/2013 | Hodson |
| 2015/0127319 | A1* | 5/2015 | Hwang ................... G06F 40/40 704/2 |
| 2015/0154284 | A1 | 6/2015 | Pfeifer et al. |
| 2017/0068665 | A1* | 3/2017 | Tamura ................... G06F 40/44 |

FOREIGN PATENT DOCUMENTS

| | | |
|---|---|---|
| CN | 101369265 A | 2/2009 |
| CN | 101419592 A | 4/2009 |
| CN | 102272755 A | 12/2011 |
| CN | 102654866 A | 9/2012 |
| CN | 102662937 A | 9/2012 |
| CN | 103853710 A | 6/2014 |
| CN | 106294308 A | 1/2017 |
| EP | 2261818 A1 | 12/2010 |

OTHER PUBLICATIONS

Hiroyuki Kaji et al: "Learning translation templates from bilingual text", Annual Meeting of the Association for Computational Inguistics. Proceedings of the Conference, Arlington, VA, US, Aug. 23, 1992, pp. 672-678, XP002469659.

Babych, Bogdan, and Anthony Hartley. "Improving machine translation quality with automatic named entity recognition." Association for Computational Linguistics, 2003. total 8 pages.

Chen, Hsin-His et al . . . "Named entity extraction for information retrieval" Computer Processing of Oriental Languages, vol. 11, No. 4, 1998, total 12 pages.

He, Yifan et al . . . "ICE: Rapid information extraction customization for nip novices." Proceedings of NAACL-HLT 2015, pp. 31-35.

Henderson, Matthew et al,. "The second dialog state tracking challenge." Proceedings of the SIGDIAL 2014 Conference, pp. 263-272.

Jenny Rose Finkel et al,. Incorporating Non-local Information into Information Extraction Systems by Gibbs Sampling. Proceedings of the 43nd Annual Meeting of the Association for Computational Linguistics (ACL 2005), pp. 363-370.

Li bo ,"Research on Chinese Named Entity Recognition Method Based on Autonomous Reasoning", Northwest University, Master's Dissertation, Jun. 2012, total 78 pages. With an English Abstract.

Walid Shalaby et al.,"Entity Type Recognition using an Ensemble of Distributional Semantic Models to Enhance Query Understanding", 2016 IEEE 40th Annual Computer Software and Applications Conference, Date of Conference: Jun. 10-14, 2016, total 6 pages.

Zhendong Yang et al: "Some Improvements in Phrase Based Statistical Machine Translation", Jan. 1, 2006 (Jan. 1, 2006) Chinese Spoken Language Processing Lecture Notes in Computer Science; Lecture Notes in Artificial Intellig Ence;LNCS, Springer, Berlin, DE, XP019051695, total:8pages.

Anonymous: "Named entity",Wikipedia, Nov. 4, 2016 (Nov. 4, 2016), XP055851828,total:2pages.

* cited by examiner

TRANSLATION METHOD AND APPARATUS

CROSS-REFERENCE TO RELATED APPLICATIONS

This application is a continuation of International Application No. PCT/CN2017/112384, filed on Nov. 22, 2017, which claims priority to Chinese Patent Application No. 201710097655.9, filed on Feb. 22, 2017. The disclosures of the aforementioned applications are hereby incorporated by reference in their entireties.

TECHNICAL FIELD

Embodiments of the present invention relate to the field of machine translation, and in particular, to a translation method and apparatus.

BACKGROUND

Machine translation is a process of converting a sentence in a language into a sentence in another language by using a computer, and machine translation may be generally divided, according to a translation method, into statistical machine translation and analysis-based machine translation. Analysis-based machine translation is performing morpheme, syntax, and semantics analysis on a sentence in a first language, converting an analyzed structure into that in a second language, and then generating a corresponding sentence in the second language.

At present, research and application of analysis-based machine translation are merely limited to unidirectional translation in general fields and a few limited fields, such as news and translation software. There is a relatively small quantity of dialog-oriented bidirectional translation. Different from another application field, machine translation oriented to the dialog field has its own characteristic. Colloquialism in a dialog scenario leads to a relatively short sentence with a plurality of syntactic elements omitted, causing diversity and ambiguity in an information expression. For example, in a hotel booking dialog scenario, "single" and "twin" mean specific room types, namely, a single room and a twin room. However, during translation by using translation software, "single" is translated into one, singles, or an unmarried person, and "twin" is translated into twins, of which meanings are completely different from those of the single room and the twin room. Therefore, a common machine translation method has a poor translation effect and a low accuracy rate in the dialog field.

SUMMARY

Embodiments of the present invention provide a translation method and apparatus, so that problems of a poor translation effect and a low accuracy rate of translation oriented to the dialog field in the prior art are resolved.

To achieve the foregoing objectives, the following technical solutions are used in the embodiments of the present invention.

According to a first aspect, a translation method is provided, where the method includes: obtaining a to-be-translated sentence, where the to-be-translated sentence is a sentence expressed in a first language in a specified dialog task; determining a first named entity set in the to-be-translated sentence, and an entity type of each first named entity in the first named entity set, where the first named entity set includes at least one first named entity; determining, based on the first named entity set and the entity type of each first named entity, a second named entity set expressed in a second language, where the second named entity set includes at least one second named entity, and the at least one second named entity is corresponding to the at least one first named entity; determining a source semantic template of the to-be-translated sentence, and obtaining a target semantic template corresponding to the source semantic template from a semantic template correspondence corresponding to the specified dialog task, where the semantic template correspondence is a correspondence between a semantic template expressed in the first language and a semantic template expressed in the second language; and determining a target translation sentence based on the second named entity set and the target semantic template, where the target translation sentence is a translated sentence that is expressed in the second language and that is corresponding to the to-be-translated sentence.

In the foregoing technical solution, during translation oriented to the dialog field, for the specified dialog task in which the to-be-translated sentence is located, the first named entity set in the to-be-translated sentence and the entity type of each first named entity are determined, and the second named entity set corresponding to the first named entity set is determined. After the source semantic template of the to-be-translated sentence is determined, the target semantic template corresponding to the source semantic template is obtained based on the semantic template correspondence corresponding to the specified dialog task. Then the target translation sentence is determined based on the second named entity set and the target semantic template, so that the to-be-translated sentence can be translated pointedly with reference to a characteristic of the specified dialog task and semantic understanding of dialog content. This can improve a translation effect and ensure a relatively high translation accuracy rate.

In one embodiment, the determining, based on the first named entity set and the entity type of each first named entity, a second named entity set expressed in a second language includes: for each first named entity in the first named entity set, obtaining, based on the entity type of the first named entity, a second named entity corresponding to the first named entity from a named entity correspondence corresponding to the specified dialog task, to obtain the second named entity set, where the named entity correspondence is a correspondence between a named entity expressed in the first language and a named entity expressed in the second language. In the foregoing embodiment, the second named entity corresponding to the first named entity is obtained from the named entity correspondence corresponding to the specified dialog task, so that translation accuracy of the first named entity can be improved, avoiding a translation error or great ambiguity due to semantic diversity of the first named entity.

In one embodiment, the method further includes: determining, based on a training corpus corresponding to the specified dialog task, the named entity correspondence corresponding to the specified dialog task, where the training corpus includes at least a training corpus expressed in the first language, and a training corpus that is expressed in the second language and that is corresponding to the training corpus expressed in the first language. In the foregoing embodiment, the training corpus corresponding to the specified dialog task is trained to obtain the named entity correspondence corresponding to the specified dialog task, so that effectiveness and accuracy of translation between named entities in the named entity correspondence can be ensured, and further, translation accuracy of the second named entity can be improved when the second named entity is determined based on the named entity correspondence.

In one embodiment, the method further includes: determining, based on the training corpus corresponding to the specified dialog task, the semantic template correspondence corresponding to the specified dialog task, where the training corpus includes at least the training corpus expressed in the first language, and the training corpus that is expressed in the second language and that is corresponding to the training corpus expressed in the first language. In the foregoing embodiment, the training corpus corresponding to the specified dialog task is trained to obtain the semantic template correspondence corresponding to the specified dialog task, so that effectiveness and accuracy of translation between semantic templates in the semantic template correspondence can be ensured, and further, translation accuracy of the source semantic template can be improved when the source semantic template is translated based on the semantic template correspondence.

In one embodiment, the method further includes: displaying first semantic information, where the first semantic information includes the first named entity set and the entity type corresponding to each first named entity; and/or displaying second semantic information, where the second semantic information includes the second named entity set and an entity type corresponding to each second named entity. In the foregoing embodiment, the first semantic information or the second semantic information or both are displayed, so that a dialog participant in the specified dialog task can sufficiently understand an intention and a meaning of the other party based on the displayed first semantic information and/or second semantic information, so as to ensure translation accuracy and correctness of the specified dialog task.

In one embodiment, after the first semantic information or the second semantic information or both are displayed, the method further includes: if a modification instruction is received, obtaining a modified sentence of the to-be-translated sentence, and translating the modified sentence. In the foregoing embodiment, when the dialog participant triggers a modification operation, the dialog participant may modify the to-be-translated sentence to express the meaning more clearly with more complete grammatical elements, so that a machine translation system re-obtains the modified sentence of the to-be-translated sentence, and translates the modified sentence. This can further ensure translation accuracy, and ensure that the specified dialog task is performed smoothly.

In one embodiment, the method further includes: when a first named entity in the first named entity set does not exist in the named entity correspondence corresponding to the specified dialog task, obtaining, based on an entity type of the first named entity, a third named entity that is expressed in the second language and that is corresponding to the first named entity; and updating, based on the entity type of the first named entity, the first named entity, and the third named entity, the named entity correspondence corresponding to the specified dialog task. In the foregoing embodiment, when the first named entity in the first named entity set does not exist in the named entity correspondence corresponding to the specified dialog task, the third named entity that is expressed in the second language and that is corresponding to the first named entity can be obtained by using a method such as receiving a manually entered third named entity or using a built-in dictionary interface for translation, and the named entity correspondence corresponding to the specified dialog task is updated, so that an updated named entity correspondence may be directly used during subsequent translation, thereby improving efficiency of subsequent translation.

According to a second aspect, a translation apparatus is provided, where the apparatus includes: an obtaining unit, configured to obtain a to-be-translated sentence, where the to-be-translated sentence is a sentence expressed in a first language in a specified dialog task; a first determining unit, configured to determine a first named entity set in the to-be-translated sentence and an entity type of each first named entity in the first named entity set, where the first named entity set includes at least one first named entity, and the first determining unit is further configured to determine, based on the first named entity set and the entity type of each first named entity, a second named entity set expressed in a second language, where the second named entity set includes at least one second named entity, and the at least one second named entity is corresponding to the at least one first named entity; a second determining unit, configured to determine a source semantic template of the to-be-translated sentence, and obtain a target semantic template corresponding to the source semantic template from a semantic template correspondence corresponding to the specified dialog task, where the semantic template correspondence is a correspondence between a semantic template expressed in the first language and a semantic template expressed in the second language; and a translation unit, configured to determine a target translation sentence based on the second named entity set and the target semantic template, where the target translation sentence is a translated sentence that is expressed in the second language and that is corresponding to the to-be-translated sentence.

In one embodiment, the first determining unit is specifically configured to: for each first named entity in the first named entity set, obtain, based on the entity type of the first named entity, a second named entity corresponding to the first named entity from a named entity correspondence corresponding to the specified dialog task, to obtain the second named entity set, where the named entity correspondence is a correspondence between a named entity expressed in the first language and a named entity expressed in the second language.

In one embodiment, the apparatus further includes: a training unit, configured to determine, based on a training corpus corresponding to the specified dialog task, the named entity correspondence corresponding to the specified dialog task, where the training corpus includes at least a training corpus expressed in the first language, and a training corpus that is expressed in the second language and that is corresponding to the training corpus expressed in the first language.

In one embodiment, the apparatus further includes: the training unit, configured to determine, based on the training corpus corresponding to the specified dialog task, the semantic template correspondence corresponding to the specified dialog task, where the training corpus includes at least the training corpus expressed in the first language, and the training corpus that is expressed in the second language and that is corresponding to the training corpus expressed in the first language.

In one embodiment, the apparatus further includes a display unit, configured to display first semantic information, where the first semantic information includes the first named entity set and the entity type corresponding to each first named entity; and/or display second semantic information, where the second semantic information includes the second named entity set and an entity type corresponding to each second named entity.

In one embodiment, the obtaining unit is further configured to: if the translation apparatus receives a modification instruction, obtain a modified sentence of the to-be-translated sentence, and translate the modified sentence.

In one embodiment, the obtaining unit is further configured to: when a first named entity in the first named entity set does not exist in the named entity correspondence corresponding to the specified dialog task, obtain, based on an entity type of the first named entity, a third named entity that is expressed in the second language and that is corresponding to the first named entity; and the apparatus further includes: an updating unit, configured to update, based on the entity type of the first named entity, the first named entity, and the third named entity, the named entity correspondence corresponding to the specified dialog task.

According to a third aspect, a translation apparatus is provided, where the translation apparatus includes a memory, a processor, a bus, and a communications interface. The memory stores code and data, the processor is connected to the memory by using the bus, and the processor runs the code in the memory, so that the translation apparatus can perform the translation method according to any one of the foregoing first aspect or the possible implementations of the first aspect.

Another aspect of this application provides a computer readable storage medium, where the computer readable storage medium stores an instruction, and when the instruction is run on a computer, the computer performs the method in the foregoing aspects.

Another aspect of this application provides a computer program product including an instruction, and when the computer program product is run on a computer, the computer performs the method in the foregoing aspects.

Understandably, any one of the apparatus, the computer readable storage medium, or the computer program product, provided above, for the translation method is configured to perform the corresponding method provided above. Therefore, for beneficial effects that can be achieved thereof, refer to the beneficial effects in the corresponding method provided above, and details are not described herein again.

DESCRIPTION OF EMBODIMENTS

Figure 1:
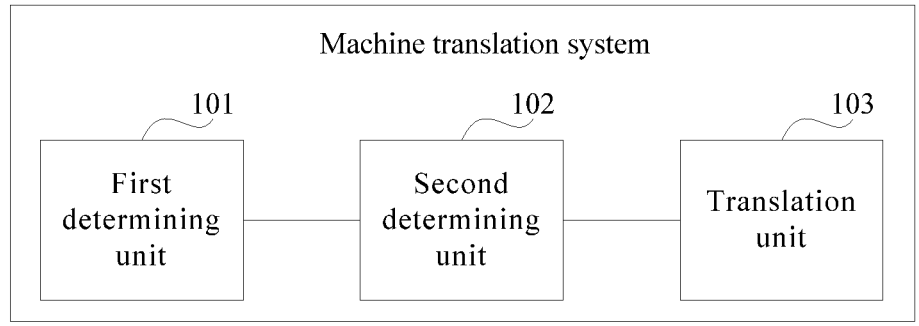
FIG. 1 is a schematic structural diagram of a machine translation system according to an embodiment of the present invention.

Before this application is described, technical terms in this application are first explained and described.

A specified dialog task is a task of dialog-oriented translation, and the specified dialog task may be any one of preset tasks. The preset task is that dialog parties use different languages for a dialog, and content of the dialog has a particular scope. For example, the preset task may include international service-oriented hotel booking, online shopping, health consultation, restaurant booking, flight ticket booking, and television and telephone conferencing, and the like.

A training corpus is a sentence pair that is used for training and that is corresponding to different languages, and the sentence pair means sentences of a same meaning that are expressed in different languages, for example, a sentence pair corresponding to Chinese and English (for example, "我是 515 房间的艾米哈里斯", "I am Amy Hams from Room 515"). The training corpus may be a training corpus corresponding to two languages, or may be a training corpus corresponding to three or more languages. A training corpus in the specified dialog task means that content or a meaning of the training corpus is about a sentence pair corresponding to different languages of the specified dialog task.

A named entity is key information in a sentence, and the key information may be a specific number, a person name, a place name, an organization name, or the like in the sentence. For example, a sentence is "我是515 房间的艾米哈里斯", and named entities in the sentence may include "515" and "Aimihalisi".

An entity type of the named entity is used to represent an attribute of the named entity. In embodiments of the present invention, the entity type of the named entity is closely related to a sentence of the named entity and a specified dialog task in which the sentence is located. The entity type of the named entity may further indicate a meaning of the named entity in the sentence of the named entity. For example, an entity type of the named entity "515" may be a room number, and an entity type of the named entity "艾米哈里斯" may be a customer name.

A named entity correspondence is, in a same entity type, a correspondence between same named entities that are expressed in different languages. For example, a named entity correspondence in a hotel booking task may be shown in the following Table 1. In Table 1, that the named entity correspondence includes a correspondence between a named entity expressed in Chinese and a named entity expressed in English is used as an example for description.

TABLE 1

| Entity type (Entity type) | Named entity expressed in Chinese | Named entity expressed in English |
| --- | --- | --- |
| Room type (Room type) | 单人房 | Single room |
|  | 双人房 | Twin room |
|  | . . . | . . . |
| Hotel name (Hotel name) | 希尔顿饭店 | Hilton Hotel |
|  | . . . | . . . |
| . . . | . . . | . . . |

A semantic template is a sentence template used to express a specific meaning. Content of a specific named entity in the semantic template may be missing, or may be replaced with an entity type of the named entity for expression. For example, a semantic template corresponding to "I am Amy Hams from Room 515" may be: I am <Customer name> from <Room No.>.

A semantic template correspondence is a correspondence between semantic templates of a same meaning that are expressed in different languages. For example, a semantic template correspondence in a hotel booking task may be shown in the following Table 2. In Table 2, that the semantic template correspondence includes a correspondence between a semantic template expressed in Chinese and a semantic template expressed in English is used as an example for description.

TABLE 2

| Semantic template expressed in Chinese | Semantic template expressed in English |
|---|---|
| 我是<房间号>的<客户姓名> | I am <Customer name> from <Room No.> |
| 我想预定一间<日期>的<房间类型> | I'd like to book a <Room type> on <Date> |
| ... | ... |

Semantic information is used to express, by using a preset entity type and a named entity included in a sentence, information about a meaning corresponding to the sentence. The semantic information may include at least one preset entity type, and information about a relationship between entity types that are of named entities and that are corresponding to at least one named entity included in a sentence. First semantic information indicates information expressed in a first language, and second semantic information indicates information expressed in a second language.

For example, in a hotel booking task, if the first language is Chinese and the second language is English, the first semantic information may be shown in the following Table 3, and the second semantic information may be shown in the following Table 4. In Table 3 and Table 4, that dialog sentences in a hotel booking task include "Hello, this is Hilton Hotel" and "我想预定一间 9 月 11 日的双人房" is used as an example for description. A named entity corresponding to the first sentence includes "Hilton Hotel", and named entities corresponding to the second sentence include "9 月 11 日" and "双人房". An entity type corresponding to "Hilton Hotel" is a hotel name, an entity type corresponding to ""9 月 11 日" is a date, and an entity type corresponding to " 双人房 " is a room type.

TABLE 3

| First semantic information | |
|---|---|
| Item (preset entity type) | Content (named entity) |
| Hotel name | 希尔顿酒店 |
| Customer name | |
| Address | |
| Tele. No. | |
| Date | 9月11日 |
| Room type | 双人房 |
| ... | ... |

TABLE 4

| Second semantic information | |
|---|---|
| Item | Content |
| Hotel name | Hilton Hotel |
| Customer name | |
| Address | |
| Tele. No. | |
| Date | 11th of September |
| Room type | Twin room |
| ... | ... |

FIG. 1 is a schematic structural diagram of a machine translation system according to an embodiment of the present invention. Referring to FIG. 1, the machine translation system includes a first determining unit 101, a second determining unit 102, and a translation unit 103.

The first determining unit 101 is configured to identify and translate a named entity in a sentence. Specifically, in a named entity training process, the first determining unit 101 may be configured to identify a named entity and define an entity type for a training corpus in any specified dialog task, and store corresponding named entities of a same entity type in a named entity correspondence. For example, the first determining unit 101 may identify a named entity by using methods such as supervised learning, field adaptation, and a rule, and define an entity type of the named entity. When translating a sentence, the first determining unit 101 may be configured to: identify a named entity in the sentence and an entity type of the named entity, and translate, based on the named entity correspondence, each named entity into a named entity corresponding to a target language. In addition, to avoid that named entities identified based on the training corpus cannot cover all named entities, the first determining unit 101 may further be provided with a dictionary interface, to add a user-defined named entity by using dictionary-based named entity identification.

The second determining unit 102 is configured to perform semantic analysis on a sentence, to obtain a semantic template. There are various semantic template representation forms, which may be a logic expression, or may be a sentence pattern. For example, the second determining unit 102 may construct, through supervised learning or by using a rule, a semantic template based on context content by using the named entity and the entity type that are identified by the first determining unit 101.

The translation unit 103 is configured to translate a to-be-translated sentence into a target translation sentence. The to-be-translated sentence may be a sentence expressed in a first language. For example, the to-be-translated sentence is a sentence expressed in Chinese. The target translation sentence may be a sentence that has a same meaning as the to-be-translated sentence and that is expressed in a second language. For example, the target translation sentence is a sentence expressed in English. After the to-be-translated sentence is translated, the machine translation system may further present the target translation sentence to a user, for example, may display the target translation sentence to the user, or play the target translation sentence for the user by voice or by video.

Figure 2:
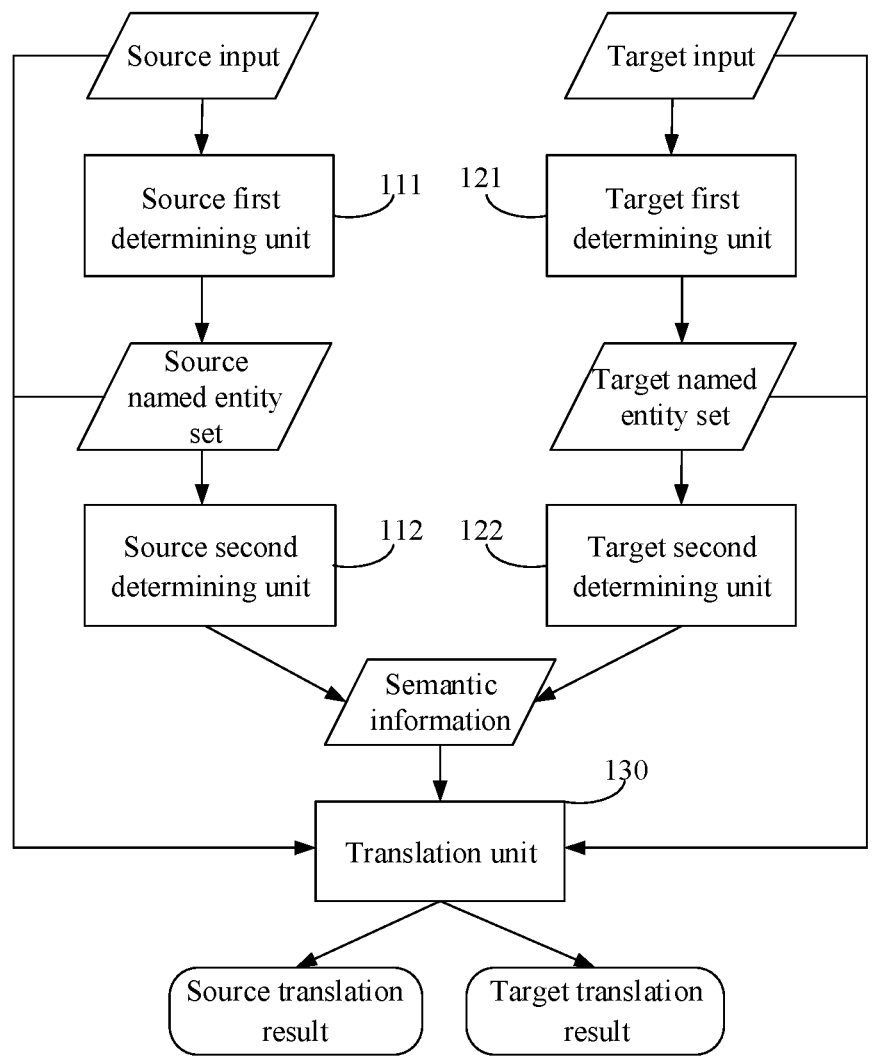
FIG. 2 is a schematic structural diagram of another machine translation system according to an embodiment of the present invention.

As shown in FIG. 2, FIG. 2 is a schematic structural diagram of another machine translation system according to an embodiment of the present invention. The machine translation system processes translation between two languages. For ease of description, translation corresponding to a first language is referred to as a source, translation corresponding to a second language is referred to as a target, and the machine translation system may include a source first determining unit 111, a source second determining unit 112, a target first determining unit 121, a target second determining unit 122, and a translation unit 130. The source first determining unit 111 and the source second determining unit 112 are configured to perform identification and analysis on a sentence and a corpus that are expressed in the first language, to obtain a named entity set and a semantic template set that are expressed in the first language. The target first determining unit 121 and the target second determining unit 122 are configured to perform identification and analysis on a sentence and a corpus that are expressed in the second language, to obtain a named entity and a semantic template that are expressed in the second language. The translation unit 130 is configured to perform sentence translation between the two languages.

A basic principle of this embodiment of the present invention lies in that a named entity correspondence is obtained by performing identification training of a named entity and an entity type on a training corpus based on a dialog task, and a semantic template correspondence is obtained by performing identification training of a semantic template. When a to-be-translated sentence is translated, a named entity in the to-be-translated sentence is identified and translated, a source semantic template in the to-be-translated sentence is identified, and a target semantic template corresponding to the source semantic template is obtained. Then a translated named entity is filled in the target semantic template based on a corresponding entity type, so as to complete translation of the to-be-translated sentence. A named entity and a source semantic template that are corresponding to the to-be-translated sentence are translated by using the named entity correspondence and the semantic template correspondence, so that translation accuracy rates of the named entity and the source semantic template can be improved. In addition, semantic information is displayed, so that both parties of a dialog can sufficiently understand each other's meanings, thereby ensuring accuracy of a target translation sentence and improving a task completion success rate.

Figure 3:
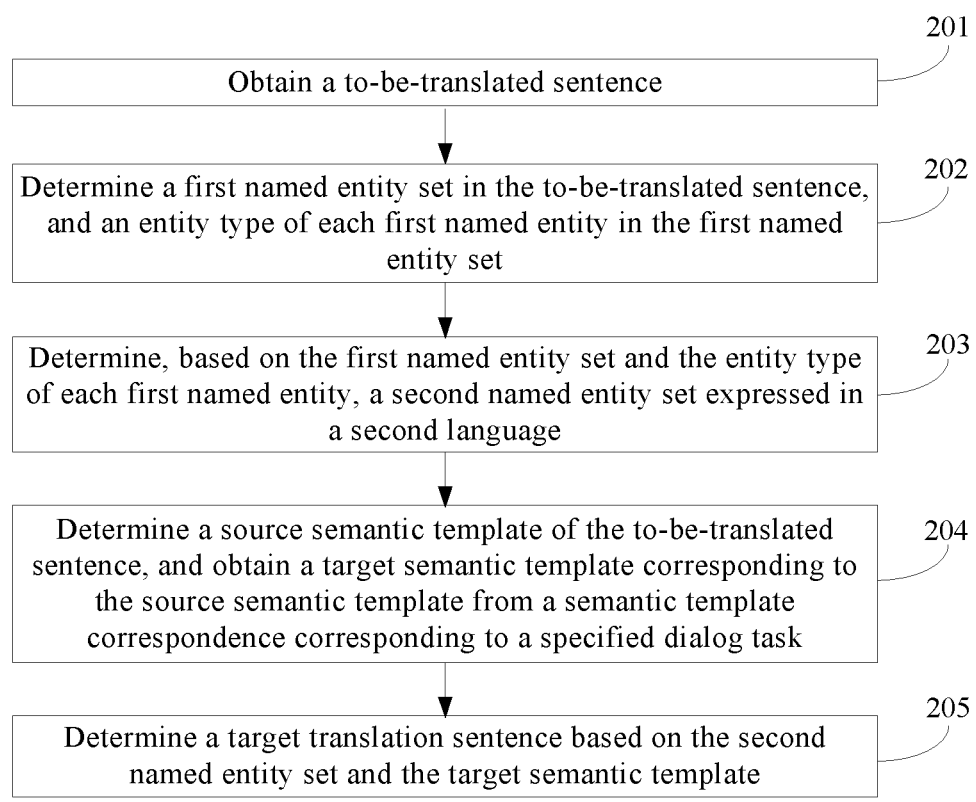
FIG. 3 is a flowchart of a translation method according to an embodiment of the present invention.

FIG. 3 is a flowchart of a translation method according to an embodiment of the present invention. Referring to FIG. 3, the method may include the following operations.

Operation 201: Obtain a to-be-translated sentence, where the to-be-translated sentence is a sentence expressed in a first language in a specified dialog task.

The specified dialog task is a task of dialog-oriented translation, and the specified dialog task may be any one of preset tasks. The preset task is that dialog parties use different languages for a dialog, and content of the dialog has a particular scope. For example, the preset task may include international service-oriented hotel booking, online shopping, health consultation, restaurant booking, flight ticket booking, and television and telephone conferencing, and the like.

In the specified dialog task, both parties of a dialog use different languages for communication. To make both parties perform barrier-free dialog communication, the machine translation system shown in the foregoing FIG. 1 may be used to translate sentences of both parties of the dialog. That is, a sentence in a language is converted into a sentence in another language, and the sentence in the dialog of both parties is referred to as the to-be-translated sentence. Languages used by both parties of the dialog may be referred to as a first language and a second language, where the first language and the second language are different languages.

For example, the first language may be Chinese, and the second language may be English; alternatively, the first language is English, and the second language is Chinese.

Operation 202: Determine a first named entity set in the to-be-translated sentence, and an entity type of each first named entity in the first named entity set, where the first named entity set includes at least one first named entity.

When the to-be-translated sentence is obtained, the machine translation system may perform a series of analysis such as morpheme, syntax, and semantic analysis on the to-be-translated sentence, and perform identification processing by using technologies such as field adaptation, transfer learning, semi-supervised learning, and a rule, to obtain the first named entity set in the to-be-translated sentence, and determine the entity type of each first named entity in the first named entity set.

The determined entity type of the first named entity in this embodiment of the present invention is greatly different from a determined entity type of a named entity in the prior art. In the prior art, the determined entity type of the named entity is a relatively wide type. For example, for a numeric-type named entity, an existing named entity identification method can be used to merely identify that an entity type of the named entity is a numeric type, but cannot be used to further determine that the number is a phone number, a credit card number, a room card number, or the like. The determined entity type of the first named entity in this embodiment of the present invention is an entity type determined after further determining. That is, the determined entity type in this embodiment of the present invention is closely related to the to-be-translated sentence and the specified dialog task, and a meaning of the first named entity in the to-be-translated sentence may further be indicated by using the entity type.

For example, a to-be-translated sentence is "我是 515 房间的艾米哈里斯", and first named entities in the to-be-translated sentence may include "515" and "艾米哈里斯". In the prior art, a determined entity type of the first named entity "515" is a number, and an entity type of the first named entity "艾米哈里斯" is a person name. In this embodiment of the present invention, a determined entity type of the first named entity "515" is a room number, and an entity type of the first named entity "艾米哈里斯" is a customer name.

Operation 203: Determine, based on the first named entity set and the entity type of each first named entity, a second named entity set expressed in a second language. The second named entity set includes at least one second named entity, and the at least one second named entity is corresponding to the at least one first named entity.

After the first named entity set and the entity type of each first named entity are determined, for each first named entity in the first named entity set, the machine translation system may determine, based on the entity type of the first named entity, a second named entity that is expressed in the second language and that is corresponding to the first named entity. Therefore, for the at least one first named entity in the first named entity set, the second named entity set can be determined and obtained, where the second named entity set includes at least one second named entity.

It should be noted that the at least one first named entity and the at least one second named entity may be in a one-to-one correspondence, or may be in a one-to-more correspondence. This is not limited in this embodiment of the present invention. When one first named entity is corresponding to at least two second named entities, the at least two second named entities have a same meaning and are just two different expressions, for example, "first" and "No. 1".

Specifically, when the machine translation system determines, based on the first named entity set and the entity type of each first named entity, the second named entity set expressed in the second language, for each first named entity in the first named entity set, the machine translation system may directly translate the first named entity into a second named entity, to obtain the second named entity set. For example, the first named entity is "9 月 11 日", and the entity type is a date. The second named entity is translated into "11th of September" based on "9 月 11 日".

Alternatively, for each first named entity in the first named entity set, the machine translation system obtains, based on the entity type of the first named entity, a second named entity corresponding to the first named entity from a named entity correspondence corresponding to the specified dialog task, to obtain the second named entity set. For example, if the named entity correspondence corresponding to the specified dialog task is shown in the foregoing Table 1, the first named entity is "单人房", and the entity type is a room type, the machine translation system obtains, based on the room type from the named entity correspondence shown in the foregoing Table 1, that a second named entity corresponding to "单人房" is "single room".

Alternatively, a first named entity in a first part in the first named entity set is directly translated, and a first named entity in a second part is obtained from a named entity correspondence corresponding to the specified dialog task, to obtain the second named entity set. The first named entity in the first part may be a common named entity that is easy to translate, for example, a time and a date. The first named entity in the second part may be a set phrase, for example, a hotel name and a room type.

Further, when the machine translation system obtains, based on the entity type of the first named entity, the second named entity corresponding to the first named entity from the named entity correspondence corresponding to the specified dialog task, the machine translation system may query whether the first named entity exists in the named entity correspondence. If it is determined that the first named entity exists, the second named entity corresponding to the first named entity is obtained from the named entity correspondence based on the entity type of the first named entity. If it is determined that the first named entity does not exist, a third named entity that is expressed in the second language and that is corresponding to the first named entity is obtained based on the entity type of the first named entity. A method for obtaining the third named entity may include: receiving a manually entered third named entity, obtaining, by using a built-in dictionary interface, a third named entity obtained through dictionary translation, or the like.

After the machine translation system obtains the third named entity corresponding to the first named entity, to facilitate direct use of the third named entity during subsequent translation, the machine translation system may update, based on the entity type of the first named entity, the first named entity, and the third named entity, the named entity correspondence corresponding to the specified dialog task. Specifically, the machine translation system stores, based on the entity type of the first named entity, the first named entity and the third named entity in a correspondence that is between a named entity expressed in the first language and a named entity expressed in the second language and that is in the named entity correspondence.

For example, when the named entity correspondence is shown in the foregoing Table 1, if the first named entity is "京都观光饭店", the entity type is a hotel name, and a corresponding third named entity is "Kyoto Hotel", the machine translation system updates, based on the entity type of the first named entity, the first named entity, and the third named entity, the named entity correspondence corresponding to the specified dialog task, as shown in the following Table 5.

TABLE 5

| Entity type (Entity type) | Named entity expressed in Chinese | Named entity expressed in English |
|---|---|---|
| Room type (Room type) | 单人房<br>双人房 | Single room<br>Twin room |
| Hotel name (Hotel name) | . . .<br>希尔顿饭店<br>京都观光饭店<br>. . . | . . .<br>Hilton Hotel<br>Kyoto Hotel<br>. . . |
| . . . | . . . | . . . |

Operation 204: Determine a source semantic template of the to-be-translated sentence, and obtain a target semantic template corresponding to the source semantic template from a semantic template correspondence corresponding to the specified dialog task, where the semantic template correspondence is a correspondence between a semantic template expressed in the first language and a semantic template expressed in the second language.

The determining a source semantic template of the to-be-translated sentence may be specifically: after determining the first named entity set in the to-be-translated sentence and the entity type of each first named entity, deleting the first named entity in the to-be-translated sentence, or replacing the first named entity in the to-be-translated sentence with a corresponding entity type, to obtain the source semantic template of the to-be-translated sentence. After the source semantic template is determined, the target semantic template corresponding to the source semantic template may be obtained from the semantic template correspondence corresponding to the specified dialog task.

For example, if the semantic template correspondence corresponding to the specified dialog task is shown in the foregoing Table 2, and a to-be-translated sentence is "我是 515 房间的史 米哈里斯", a determined source semantic template may be "我是<房间号> 的<客户姓名>", and the target semantic template that is corresponding to the source semantic template and that is obtained from the foregoing Table 2 is "I am <Customer name> from <Room No.>".

Operation 205: Determine a target translation sentence based on the second named entity set and the target semantic template, where the target translation sentence is a translated sentence that is expressed in the second language and that is corresponding to the to-be-translated sentence.

After the machine translation system determines the second named entity set and the target semantic template, the machine translation system may correspondingly fill a second named entity in a corresponding location in the target semantic template based on an entity type of each second named entity in the second named entity set, to obtain the target translation sentence. The entity type of the second named entity is consistent with the entity type of the first named entity corresponding to the second named entity.

For example, a to-be-translated sentence is "我想预定一间 9 月 11 日的双人房", the first named entity set that is determined according to the foregoing operation 201 to operation 204 includes "9 月 11 日" (a date) and "双人房" (a room type), the second named entity set corresponding to the determined first named entity set includes "11th of September" (date) and "Twin Room" (room type), and the target semantic template is "I'd like to book a <Room type> on <Date>". The target translation sentence determined based on the second named entity set and the target semantic template is "I'd like to book a twin room on 11th of September".

Finally, after the machine translation system determines the target translation sentence, the machine translation system may present the target translation sentence to a dialog participant in the specified dialog task. For example, after a to-be-translated sentence expressed in Chinese is translated into a target translation sentence expressed in English, the machine translation system presents the target translation sentence expressed in English to a dialog participant who speaks English in the dialog, so as to facilitate dialog communication between specified dialog participants.

In one embodiment of the present invention, a second named entity corresponding to each first named entity is determined by determining the first named entity set in the to-be-translated sentence expressed in the first language, and the entity type of each first named entity, to obtain the second named entity set, the source semantic template of the to-be-translated sentence is determined, and the target semantic template corresponding to the source semantic template is obtained. Therefore, the target translation sentence is determined based on the second named entity set and the target semantic template. A determined named entity expressed in the second language is inserted into a corresponding location of a target semantic template, thereby improving translation accuracy of the named entity and the semantic template. This ensures accuracy of sentence translation and ensures that the specified dialog task is performed smoothly.

Figure 4:
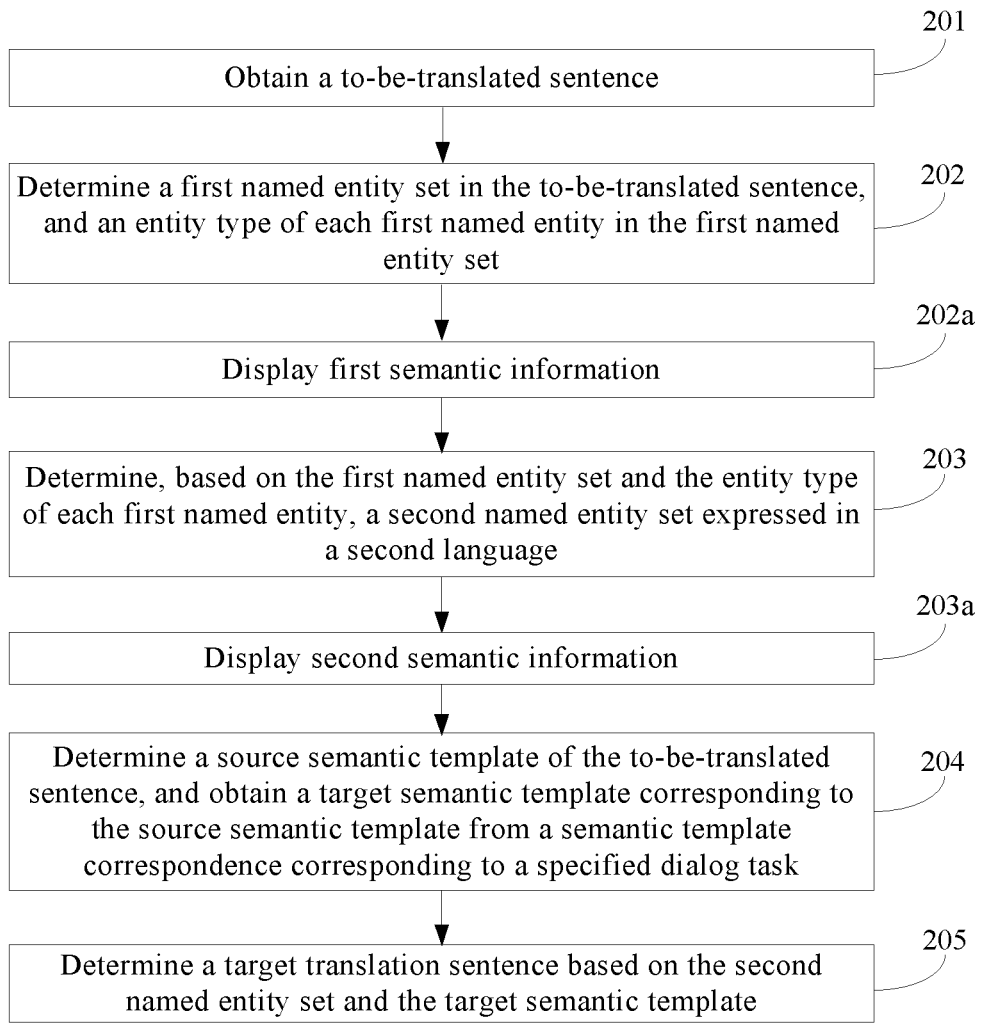
FIG. 4 is a flowchart of another translation method according to an embodiment of the present invention.

Further, referring to FIG. 4, the method further includes: operation 202a and/or operation 203a. Operation 202a may be performed after operation 202, and there is no sequence between operation 202a and operation 203 to operation 205. Operation 203a may be performed after operation 203, and there is no sequence between operation 203a and operations 204 and 205.

Operation 202a: Display first semantic information, where the first semantic information includes the first named entity set and the entity type corresponding to each first named entity.

After the machine translation system determines the first named entity set in the to-be-translated sentence and the entity type of each first named entity, the machine translation system may present the first named entity set and the entity type of each first named entity to the dialog participant in the specified dialog task by displaying the first semantic information. Specifically, the machine translation system may present the first semantic information including the first named entity set and the entity type of each first named entity to the dialog participant who uses the first language, so that the dialog participant determines correctness of the first semantic information.

Operation 203a: Display second semantic information, where the second semantic information includes the second named entity set and an entity type corresponding to each second named entity.

Likewise, after the machine translation system determines the second named entity set, the machine translation system may present the second named entity set and the entity type of each second named entity to the dialog participant in the specified dialog task by displaying the second semantic information. Specifically, the machine translation system may present the second semantic information including the second named entity set and the entity type of each second named entity to the dialog participant who uses the second language, so that the dialog participant determines correctness of the second semantic information.

In one embodiment, the first semantic information and the second semantic information may include information about one to-be-translated sentence in the specified dialog task, or may include information about a plurality of to-be-translated sentences. That is, in the specified dialog task, the machine translation system may display the first semantic information and/or the second semantic information for each to-be-translated sentence in the dialog, or may display the first semantic information and/or the second semantic information for a plurality of to-be-translated sentences in the dialog. This is not limited in this embodiment of the present invention.

In addition, the first semantic information may also include content of the second semantic information, or the second semantic information may also include content of the first semantic information. That is, the machine translation system may present the content of both the first semantic information and the second semantic information to one or more dialog participants in the specified dialog task, so that the dialog participant can see semantic information that is expressed in the first language and expressed in the second language.

Figure 5:
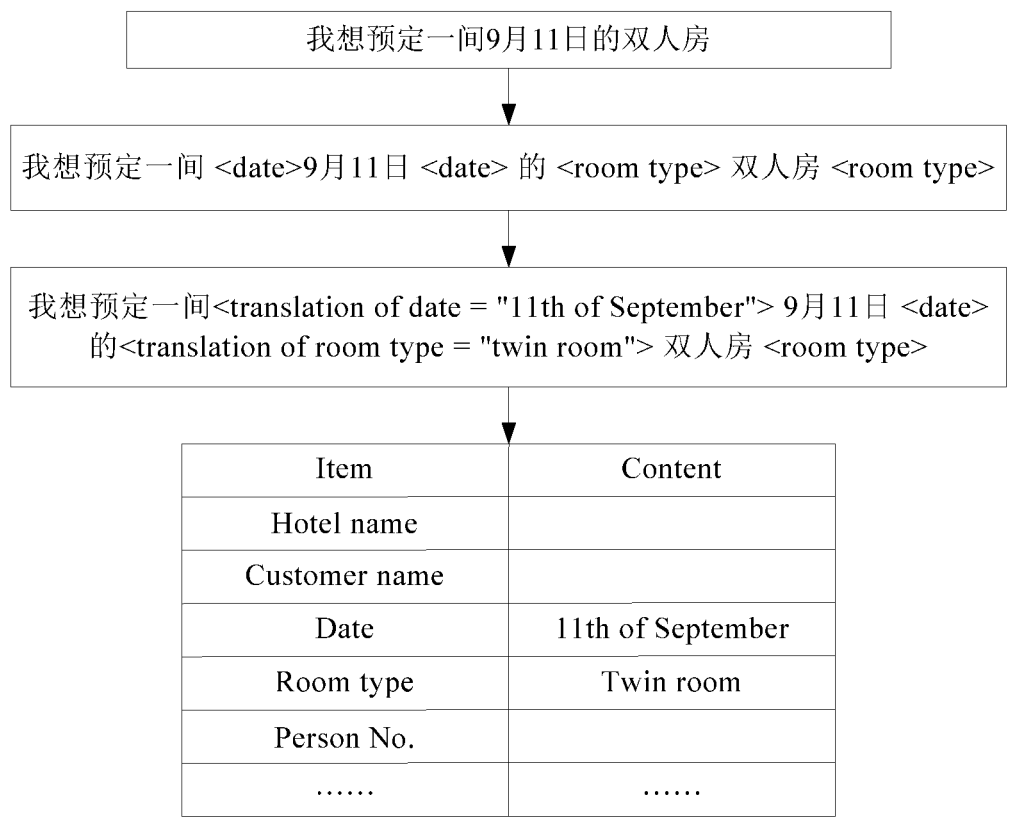
FIG. 5 is a schematic diagram of a translation example according to an embodiment of the present invention.

For example, as shown in FIG. 5, if the first language is Chinese, the second language is English, and a to-be-translated sentence is "我想预定一间 9 月 11 日的双人房", after the second named entity set is determined according to the foregoing operation 201 to operation 203, the machine translation system presents the second semantic information shown in FIG. 5 to the dialog participant.

In addition, the first semantic information and/or the second semantic information may further include other information, and the other information may be set based on specific task content of the specified dialog task. For example, for a complete dialog for hotel booking, the second semantic information may be shown in the following Table 6. Table 6 includes first named entities in a plurality of to-be-translated sentences, second named entities corresponding to the first named entities, and entity types, and further includes classification of the content, for example, hotel information (hotel information), customer information (customer information), booking information (booking information), and others (Others).

TABLE 6

| Type | Item | Source_Content | Target_Content |
|---|---|---|---|
| Hotel information | Hotel name | Hilton Hotel | 希尔顿酒店 |
|  | Agent name | Suzuki | 铃木 |
| Customer information | Customer name | Amy Hams | 艾米哈里斯 |
|  | Address | Hotel New Tokyo room eight zero three | 新东京饭店八零三房间 |
|  | Tele. No. | Zero three three four eight seven | 零三三四八七 |
| Booking information | Date | 11th of September | 9月11日 |
|  | Person No. | One | 一个 |
|  | Room type | Twin Room | 双人房 |
|  | Room price | Thirty thousand yen | 三万日元 |
|  | Payment | VISA card | 维萨卡 |
|  | Check-in time | Six o'clock | 六点 |
| Others | Breakfast | Japanese | 日式 |
|  | . . . |  |  |

In this embodiment of the present invention, the first language information or the second language information or both are displayed, so that the dialog participant in the specified dialog task can sufficiently understand each other's intention and meaning based on the displayed first semantic information and/or second semantic information, so as to ensure translation accuracy and correctness of the specified dialog task.

Further, after the machine translation system displays the first semantic information and/or displays the second semantic information, the method further includes: if a modification instruction is received, obtaining a modified sentence of the to-be-translated sentence, and translating the modified sentence.

After the machine translation system displays the first semantic information and/or displays the second semantic information, if the dialog participant in the specified dialog task determines that displayed content is incorrect, the dialog participant may trigger the modification instruction to the machine translation system by using a specified operation. When receiving the modification instruction, the machine translation system may obtain the modified sentence of the to-be-translated sentence, and translate the modified sentence according to the method described in the foregoing step 202 to step 205.

In this embodiment of the present invention, the to-be-translated sentence in the specified dialog task is relatively colloquial and short, and a grammatical element may also be omitted. Therefore, when the dialog participant triggers the modification operation by using the machine translation system, the dialog participant may modify the to-be-translated sentence to make a meaning expressed by the to-be-translated sentence clearer, and more complete in terms of grammatical elements, so that the machine translation system re-obtains the modified sentence of the to-be-translated sentence, and translates the modified sentence. This can ensure translation accuracy, and ensure that the specified dialog task is performed smoothly.

Figure 6:
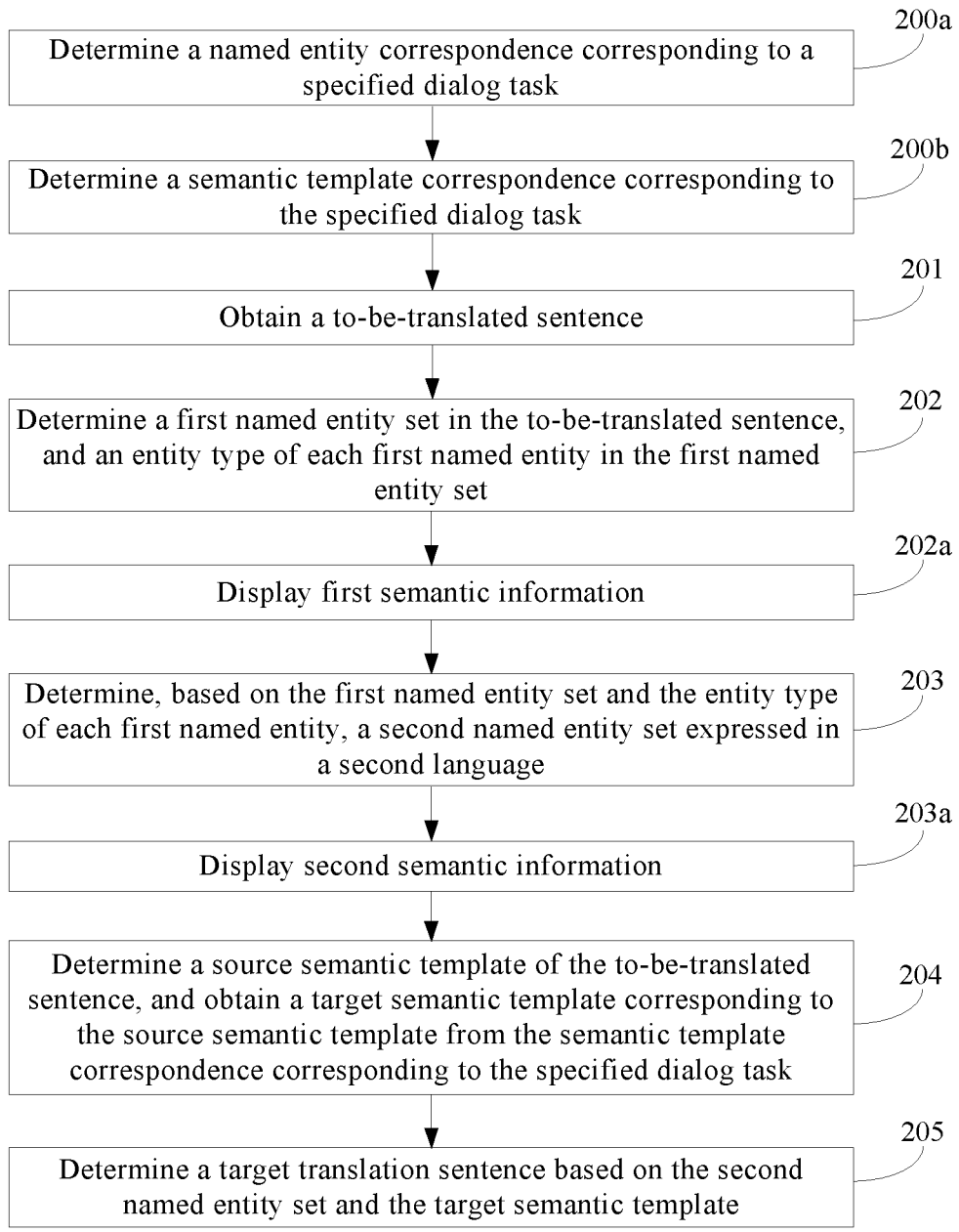
FIG. 6 is a flowchart of still another translation method according to an embodiment of the present invention.

Further, referring to FIG. 6, the method further includes: operation 200a and/or operation 200b. Operation 200a and operation 200b may be performed before operation 201, and there is no sequence between operation 200a and operation 200b. In FIG. 6, that the method includes operation 200a and operation 200b, and operation 200a and operation 200b are performed before operation 201 is used as an example for description.

Operation 200a: Determine, based on a training corpus corresponding to the specified dialog task, the named entity correspondence corresponding to the specified dialog task.

The training corpus includes at least a training corpus expressed in the first language, and a training corpus that is expressed in the second language and that is corresponding to the training corpus expressed in the first language.

The training corpus may be a common dialog corpus in the specified dialog task, and may also include some extended training corpora related to the specified dialog task. The extended training corpus may be a dialog that is selected from a large quantity of dialog corpora by using a data filtering technology and that is related to the specified dialog task. For example, filtering may be performed by using the data filtering technology on multilingual dialog corpora that are related to the specified dialog task and that are of, for example, a movie or a TV series.

In one embodiment, when the machine translation system determines, based on the training corpus corresponding to the specified dialog task, the named entity correspondence corresponding to the specified dialog task, the machine translation system may perform training in a plurality of different training manners, for example, may train, by using a sequence labeling model for supervised learning, or with reference to methods such as field adaption and rule matching, the training corpus corresponding to the specified dialog task, to obtain the corresponding named entity correspondence.

Operation 200b: Determine, based on the training corpus corresponding to the specified dialog task, the semantic template correspondence corresponding to the specified dialog task.

In one embodiment, when the machine translation system determines, based on the training corpus corresponding to the specified dialog task, the semantic template correspondence corresponding to the specified dialog task, the machine translation system may determine, from the training corpus corresponding to the specified dialog task, the corresponding semantic template correspondence by using methods such as supervised learning and a rule with reference to information such as a dialog status and an entity type. The dialog status may be a category representation of a meaning of a sentence. For example, intentions of both sentences "Qing wen nin guixing" and "Ni jiao shenme mingzi?" are to ask name information of the other party, so that a same category (for example, asking a name) may be used to express the meaning.

Figure 7:
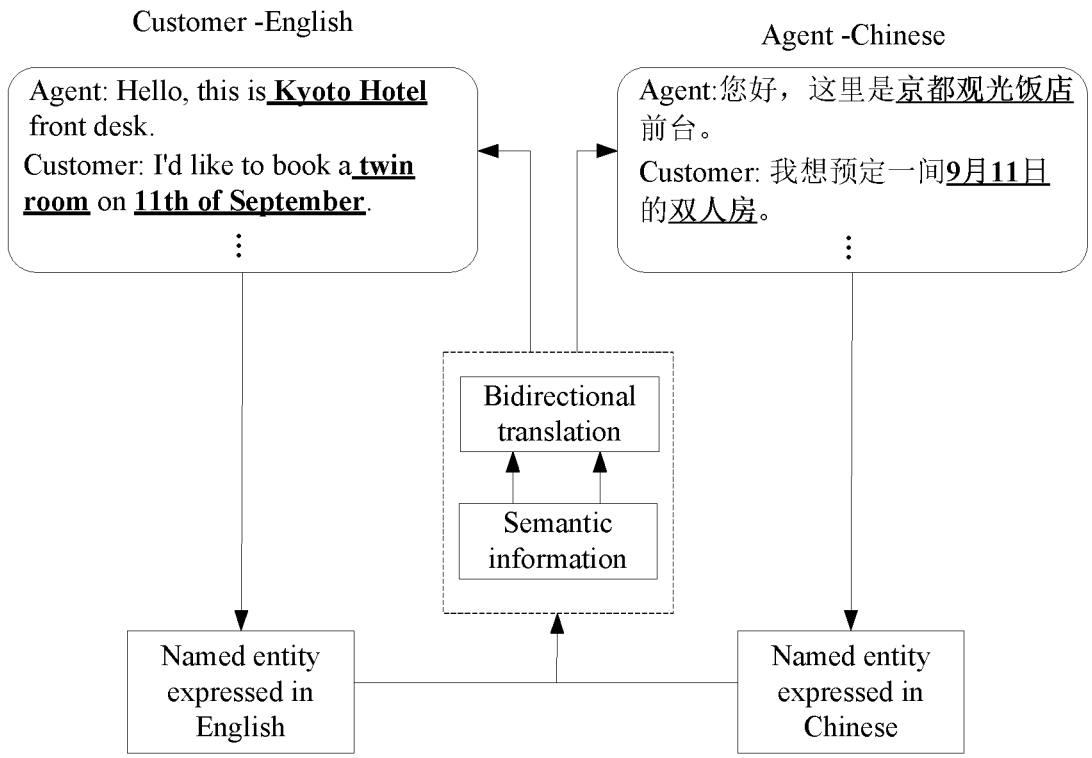
FIG. 7 is a schematic diagram of training of a training corpus according to an embodiment of the present invention.

For example, using training between a training corpus expressed in Chinese and a training corpus expressed in English as an example, if the specified dialog task is hotel booking, a process in which the machine translation system obtains a named entity correspondence by using the foregoing step 200a, and obtains a semantic template correspondence by using the foregoing step 200b may be shown in FIG. 7. That a language used by a customer (customer) is English and a language used by an agent (agent) of a hotel is Chinese is used as an example for description in FIG. 7.

Using a training corpus shown in FIG. 7 as an example, the machine translation system obtains, by training a training corpus expressed in English, that named entities expressed in English include "Kyoto Hotel", "twin room", and "11th of September"; and obtains, by training a corresponding training corpus expressed in Chinese, that named entities expressed in Chinese include "京都观光饭店 9 月 11 日", and "双人房". A determined entity type of "Kyoto Hotel" and "京都观光饭店" is a hotel name (hotel name), a determined entity type of "twin room" and "双人房" is a room type (room type), and a determined entity type of "11th of September" and "9 月 11 日" is a date (date). Therefore, the named entity correspondence obtained by training by the machine translation system may be shown in the following Table 7.

TABLE 7

| Entity type (Entity type) | Named entity expressed in Chinese | Named entity expressed in English |
|---|---|---|
| Room type (Room type) | 双人房 | Twin room |
| ... | ... | ... |
| Hotel name (Hotel name) | 希尔顿饭店 | Hilton Hotel |
| ... | ... | ... |
| Date (date) | 9月11日 | 11th of September |
| ... | ... | ... |

It should be noted that the machine translation system may not store, in the named entity correspondence, a named entity pair that is relatively easy to translate, and an entity type of the named entity pair, for example, a named entity pair ("9 月 11 日" and "11th of September") whose entity type is a date (date). Therefore, memory space of the machine translation system can be saved, and performing translation directly based on the determined entity type during translation does not affect translation accuracy. Certainly, the machine translation system may alternatively store the named entity pair and the entity type in the named entity correspondence. This is not specifically limited in this embodiment of the present invention.

In addition, the machine translation system obtains, by training a training corpus expressed in English, semantic templates expressed in English that include "This is <Hotel name> front desk" and "I'd like to book a <Room type> on <Date>"; and obtains, by training a corresponding training corpus expressed in Chinese, semantic templates expressed in Chinese that include "这里是<酒店 名称>前台" and "我想预定一间<日期>的<房间类型>". Therefore, the semantic template correspondence obtained by training by the machine translation system may be shown in the following Table 8.

TABLE 8

| Semantic template expressed in Chinese | Semantic template expressed in English |
|---|---|
| 这里是<酒店名称>前台 | This is <Hotel name> front desk |
| 我想预定一间<日期>的 | I'd like to book a <Room type> on <Date> |
| ... | ... |

Further, when translating a to-be-translated sentence for hotel booking, the machine translation system may perform translation based on the named entity correspondence shown in the foregoing Table 7 and the semantic template correspondence shown in the foregoing Table 8, and present a target sentence to a customer and/or an agent (agent).

In one embodiment of the present invention, a correspondence that is between a named entity expressed in the first language and a named entity expressed in the second language and that is included in the named entity correspondence may be a one-to-one, one-to-more, more-to-one, or more-to-more correspondence. This is not limited in this embodiment of the present invention. For example, "双人房" may also be referred to as "双 床房", and corresponding English may be "twin room" or may be "double room". Likewise, a correspondence that is between a semantic template expressed in the first language and a semantic template expressed in the second language and that is included in the semantic template correspondence may also be a one-to-one, one-to-more, more-to-one, or more-to-more correspondence. This is not limited in this embodiment of the present invention.

Further, after the machine translation system determines an entity type of each named entity included in the first named entity set in the to-be-translated sentence, the machine translation system may further perform standardization processing on the entity type. Standardization processing means standardizing different description manners of a same thing into one description manner, where the standardized description manner may be a written description manner, or may be a relatively universal description manner. For example, when the entity type of the first named entity "Aimihalisi" is determined as a customer name, the machine translation system may standardize the customer name into a customer full name.

Likewise, after the machine translation system determines the source semantic template of the to-be-translated sentence, the machine translation system may further perform standardization processing on the source semantic template. That is, a description manner of the source semantic template is standardized into a written description manner or a relatively universal description manner.

According to the method, provided in one embodiment of the present invention, for determining a named entity, an actual translation effect of hotel booking is evaluated based on a standard dataset, and results are shown in the following Table 9. Based on the standard dataset (test set), both a high accuracy rate (P) and recall rate (R) are obtained in identification and translation of a named entity in this embodiment of the present invention, and translation F values of 92.59% and 96.37% can ensure trustability of the named entity entering the machine translation system.

TABLE 9

| Language | Task | Accuracy rate | Recall rate | F value |
|---|---|---|---|---|
| Chinese | Identification | 98.21% | 99.76% | 98.99% |
| | Translation | 91.86% | 93.33% | 92.59% |
| English | Identification | 97.78% | 96.04% | 96.90% |
| | Translation | 97.24% | 95.52% | 93.37% |

Figure 8:
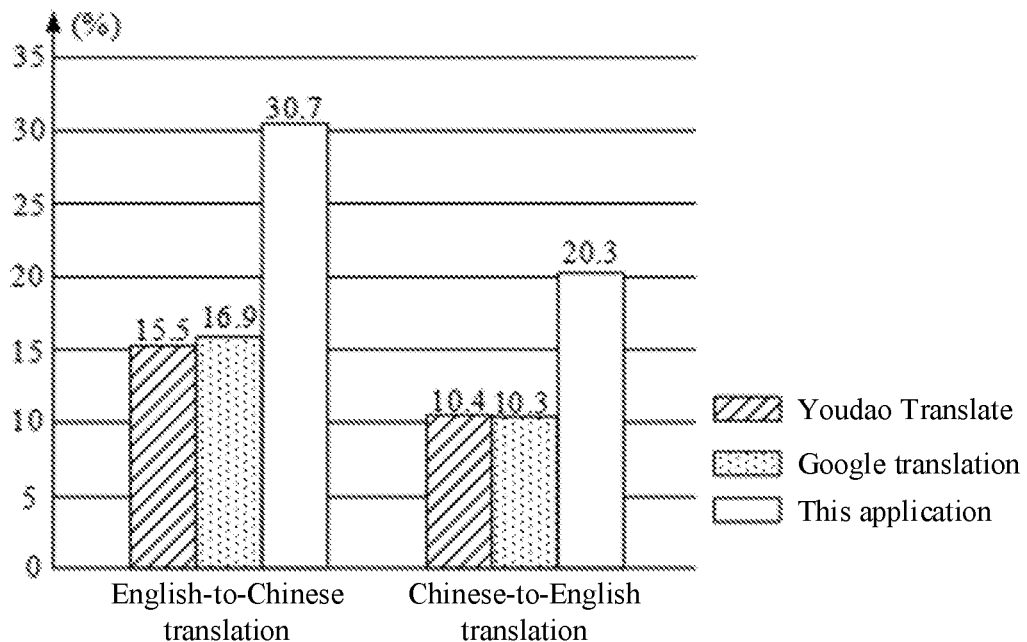
FIG. 8 is a schematic comparison diagram of a translation result according to an embodiment of the present invention.

In addition, in the standard dataset (test set), according to the translation method provided in this embodiment of the present invention, in comparison with accuracy rates of Google translation and Youdao Translate, accuracy rates of translation performed according to this application are shown in FIG. 8. For English-to-Chinese translation, an accuracy rate is 30.7% according to the method provided in this embodiment of the present invention; however, accuracy rates of Google translation and Youdao Translate are merely around 15%. For Chinese-to-English translation, an accuracy rate is 20.3% according to the method provided in this embodiment of the present invention; however, accuracy rates of Google translation and Youdao Translate are merely around 10%.

In one embodiment of the present invention, for the specified dialog task, the first named entity set in the to-be-translated sentence expressed in the first language, and the entity type of each first named entity are determined, and a second named entity corresponding to each first named entity is determined based on the named entity correspondence obtained by training the training corpus, so that a translation accuracy rate of a named entity can be improved. In addition, the source semantic template of the to-be-translated sentence is determined, and the target semantic template corresponding to the source semantic template is obtained based on the semantic template correspondence obtained by training the training corpus, so that translation accuracy of the semantic template can be ensured. Then the target translation sentence is determined based on the second named entity set and the target semantic template. A determined named entity expressed in the second language is inserted into a corresponding location of a target semantic template, so that translation accuracy of the to-be-translated sentence is ensured, and the specified dialog task can be performed correctly and smoothly.

The solutions provided in the embodiments of the present invention are described above from a perspective of a translation method procedure performed by a device. It may be understood that, to implement the foregoing functions, the device (such as a translation apparatus) includes a corresponding hardware structure and/or software module for performing the functions. A person skilled in the art should be easily aware that, in combination with example devices and algorithm steps described in the embodiments disclosed in this specification, this application can be implemented by hardware or a combination of hardware and computer software. Whether a function is performed by hardware or by computer software driving hardware depends on particular applications and design constraint conditions of the technical solutions. A person skilled in the art may use different methods to implement the described functions for each particular application, but it should not be considered that the implementation goes beyond the scope of this application.

Division of functional modules may be performed on the translation apparatus according to the foregoing method examples in the embodiments of this application. For example, various functional modules corresponding to various functions may be obtained through division, or two or more functions may be integrated into a processing module. The foregoing integrated module may be implemented in a form of hardware, or may be implemented in a form of a software functional module. It should be noted that the division of modules in the embodiments of this application is an example, and is merely logical function division, and another division manner may be used in actual implementation.

Figure 9:
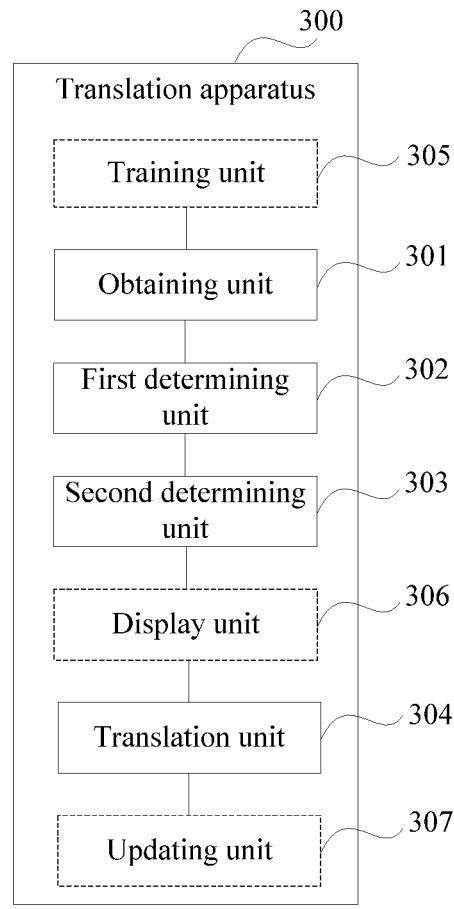
FIG. 9 is a schematic structural diagram of a translation apparatus according to an embodiment of the present invention.

When the functional modules corresponding to the functions are obtained through division, FIG. 9 shows a possible schematic structural diagram of a translation apparatus related to the foregoing embodiments. The translation apparatus 300 includes: an obtaining unit 301, a first determining unit 302, a second determining unit 303, and a translation unit 304. The obtaining unit 301 is configured to perform operation 201 in FIG. 3, FIG. 4, or FIG. 6. The first determining unit 302 is configured to perform operation 202 and operation 203 in FIG. 3, FIG. 4, or FIG. 6. The second determining unit 303 is configured to perform operation 204 in FIG. 3, FIG. 4, or FIG. 6. The translation unit 304 is configured to perform operation 205 in FIG. 3, FIG. 4, or FIG. 6. Further, the translation apparatus 300 may further include: a training unit 305, and/or a display unit 306, and/or an updating unit 307. The training unit 305 is configured to perform operation 200a and operation 200b in FIG. 6. The display unit 306 is configured to perform operation 202a and operation 203a in FIG. 4 and FIG. 6. All related content of the operations in the foregoing method embodiments can be quoted in function description of the corresponding functional modules, and details are not described herein again.

For hardware implementation, the foregoing first determining unit 302, second determining unit 303, translation unit 304, training unit 305, and updating unit 307 may be a processor, the obtaining unit 301 may be an input device (such as a keyboard or a touchscreen), and the display unit 306 may be a display.

Figure 10:
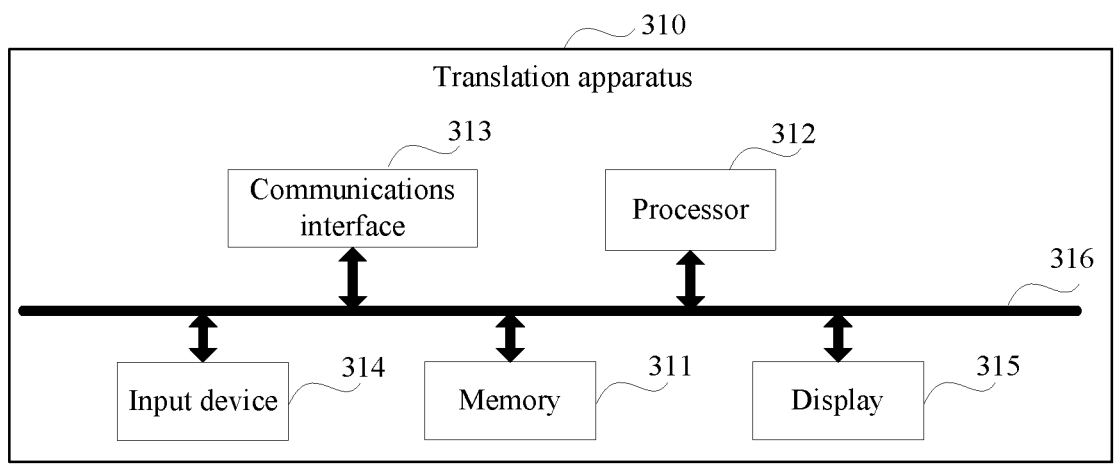
FIG. 10 is a schematic structural diagram of another translation apparatus according to an embodiment of the present invention.

As shown in FIG. 10, FIG. 10 is a possible schematic diagram of a logic structure of a translation apparatus 310 related to the foregoing embodiment according to an embodiment of the present invention. The translation apparatus 310 includes: a processor 312, a communications interface 313, a memory 311, an input device 314, a display 315, and a bus 316. The processor 312, the communications interface 313, the memory 311, the input device 314, and the display 315 are connected to each other by using the bus 316. In this embodiment of the present invention, the processor 312 is configured to control and manage an action of the translation apparatus 310. For example, the processor 312 is configured to perform step 202 to step 205 in FIG. 3, FIG. 4, or FIG. 6, step 202a and step 203a in FIG. 4 or FIG. 6, and step 200a and step 200b in FIG. 6, and/or is configured to perform another process of a technology described in this specification. The communications interface 313 is configured to support communication by the translation apparatus 310. The memory 311 is configured to store program code and data of the translation apparatus 310.

The input device 314 is configured to support external input to the translation apparatus 310. The display 315 is configured to support display by the translation apparatus 310.

The processor 312 may be a central processing unit, a general purpose processor, a digital signal processor, an application-specific integrated circuit, a field programmable gate array or another programmable logic device, a transistor logic device, a hardware component, or any combination thereof. The processor 312 may implement or execute various example logical blocks, modules, and circuits described with reference to content disclosed in this application. The processor may also be a combination implementing a computing function, for example, a combination including one or more microprocessors, or a combination of a digital signal processor and a microprocessor. The bus 316 may be a peripheral component interconnect (PCI) bus, an Extended Industry Standard Architecture (EISA) bus, or the like. The bus may be classified into an address bus, a data bus, a control bus, and the like. For ease of representation, in FIG. 10, only one thick line is used to represent the bus, but it does not indicate that there is only one bus or only one type of bus.

In this embodiment of the present invention, for a specified dialog task, the translation apparatus determines a first named entity set in a to-be-translated sentence expressed in a first language, and an entity type of each first named entity, and determines, based on a named entity correspondence obtained by training a training corpus, a second named entity corresponding to each first named entity, so that a translation accuracy rate of the named entity can be improved. In addition, a source semantic template of the to-be-translated sentence is determined, and a target semantic template corresponding to the source semantic template is obtained based on a semantic template correspondence obtained by training the training corpus, so that translation accuracy of the semantic template can be ensured. Then a target translation sentence is determined based on a second named entity set and the target semantic template. A determined named entity expressed in a second language is inserted into a corresponding location of a target semantic template, so that translation accuracy of the to-be-translated sentence is ensured, and the specified dialog task can be performed correctly and smoothly.

Finally, it should be noted that the foregoing descriptions are merely specific implementations of this application, but the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A translation method, comprising:
obtaining a sentence to be translated, wherein the to-be-translated sentence is a sentence expressed in a first language in a specified dialog task;
identifying the specified dialog task from a plurality of dialog tasks to determine a scope of content for the specified dialog task;
determining a named entity correspondence from a plurality of named entity correspondences based on the specified dialog task, wherein a first named entity correspondence is associated with a first dialog task of the plurality of dialog tasks and a second named entity correspondence is associated with a second dialog task of the plurality of dialog tasks;

determining a first named entity set in the to-be-translated sentence and an entity type of each first named entity in the first named entity set, wherein the first named entity set comprises at least one first named entity;

determining, based on the first named entity set, the entity type of each first named entity, and the named entity correspondence, a second named entity set expressed in a second language, wherein the second named entity set comprises at least one second named entity, and the at least one second named entity is corresponding to the at least one first named entity;

determining a source semantic template of the to-be-translated sentence, and obtaining a target semantic template corresponding to the source semantic template from a semantic template correspondence based on the specified dialog task, wherein the semantic template correspondence is a correspondence between a semantic template expressed in the first language and a semantic template expressed in the second language; and determining a target translation sentence based on the second named entity set and the target semantic template, wherein the target translation sentence is a translated sentence that is expressed in the second language and that is corresponding to the to-be-translated sentence.

2. The method according to claim 1, wherein determining a second named entity set expressed in a second language comprises:

for each first named entity in the first named entity set, obtaining, based on the entity type of the first named entity, a second named entity corresponding to the first named entity from the named entity correspondence corresponding to the specified dialog task to obtain the second named entity set, wherein the named entity correspondence is a correspondence between a named entity expressed in the first language and a named entity expressed in the second language.

3. The method according to claim 2, further comprising: determining, based on a training corpus corresponding to the specified dialog task, the named entity correspondence corresponding to the specified dialog task, wherein the training corpus comprises at least a training corpus expressed in the first language and a training corpus expressed in the second language and corresponding to the training corpus expressed in the first language.

4. The method according to claim 2, further comprising: when a first named entity in the first named entity set does not exist in the named entity correspondence corresponding to the specified dialog task, obtaining, based on an entity type of the first named entity, a third named entity that is expressed in the second language and that is corresponding to the first named entity; and updating, based on the entity type of the first named entity, the first named entity, and the third named entity, the named entity correspondence corresponding to the specified dialog task.

5. The method according to claim 1, further comprising: determining, based on a training corpus corresponding to the specified dialog task, the semantic template correspondence corresponding to the specified dialog task, wherein the training corpus comprises at least the training corpus expressed in the first language and the training corpus expressed in the second language and corresponding to the training corpus expressed in the first language.

6. The method according to claim 1, further comprising: displaying first semantic information, wherein the first semantic information comprises the first named entity set and the entity type corresponding to each first named entity; and/or displaying second semantic information, wherein the second semantic information comprises the second named entity set and an entity type corresponding to each second named entity.

7. A translation apparatus, comprising:

a processor; and a memory configured to store codes, which when executed by the processor, cause the processor to perform a translation method, the method comprising:

obtaining a sentence to be translated, wherein the to-be-translated sentence is a sentence expressed in a first language in a specified dialog task;

identifying the specified dialog task from a plurality of dialog tasks to determine a scope of content for the specified dialog task;

determining a named entity correspondence from a plurality of named entity correspondences based on the specified dialog task, wherein a first named entity correspondence is associated with a first dialog task of the plurality of dialog tasks and a second named entity correspondence is associated with a second dialog task of the plurality of dialog tasks;

determining a first named entity set in the to-be-translated sentence and an entity type of each first named entity in the first named entity set, wherein the first named entity set comprises at least one first named entity;

determining, based on the first named entity set, the entity type of each first named entity, and the named entity correspondence, a second named entity set expressed in a second language, wherein the second named entity set comprises at least one second named entity, and the at least one second named entity is corresponding to the at least one first named entity;

determining a source semantic template of the to-be-translated sentence, and obtaining a target semantic template corresponding to the source semantic template from a semantic template correspondence based on the specified dialog task, wherein the semantic template correspondence is a correspondence between a semantic template expressed in the first language and a semantic template expressed in the second language; and determining a target translation sentence based on the second named entity set and the target semantic template, wherein the target translation sentence is a translated sentence that is expressed in the second language and that is corresponding to the to-be-translated sentence.

8. The apparatus according to claim 7, wherein determining a second named entity set expressed in a second language comprises:

for each first named entity in the first named entity set, obtaining, based on the entity type of the first named entity, a second named entity corresponding to the first named entity from the named entity correspondence corresponding to the specified dialog task to obtain the second named entity set, wherein the named entity correspondence is a correspondence between a named entity expressed in the first language and a named entity expressed in the second language.

9. The apparatus according to claim 8, wherein the translation method further comprises:

determining, based on a training corpus corresponding to the specified dialog task, the named entity correspondence corresponding to the specified dialog task, wherein the training corpus comprises at least a training corpus expressed in the first language and a training corpus that is expressed in the second language and that is corresponding to the training corpus expressed in the first language.

10. The apparatus according to claim 8, wherein translation method further comprises:
when a first named entity in the first named entity set does not exist in the named entity correspondence corresponding to the specified dialog task, obtaining, based on an entity type of the first named entity, a third named entity that is expressed in the second language and that is corresponding to the first named entity; and
updating, based on the entity type of the first named entity, the first named entity, and the third named entity, the named entity correspondence corresponding to the specified dialog task.

11. The apparatus according to claim 7, wherein the translation method further comprises:
determining, based on a training corpus corresponding to the specified dialog task, the semantic template correspondence corresponding to the specified dialog task, wherein the training corpus comprises at least the training corpus expressed in the first language, and the training corpus that is expressed in the second language and that is corresponding to the training corpus expressed in the first language.

12. The apparatus according to claim 7, wherein the translation method further comprises:
displaying first semantic information, wherein the first semantic information comprises the first named entity set and the entity type corresponding to each first named entity; and/or
displaying second semantic information, wherein the second semantic information comprises the second named entity set and an entity type corresponding to each second named entity.

13. A non-transitory computer readable storage medium comprising a computer instruction, which when executed by a processor, cause the processor to perform a translation method, the method comprising:
obtaining a sentence to be translated, wherein the to-be-translated sentence is a sentence expressed in a first language in a specified dialog task;
identifying the specified dialog task from a plurality of dialog tasks to determine a scope of content for the specified dialog task;
determining a named entity correspondence from a plurality of named entity correspondences based on the specified dialog task, wherein a first named entity correspondence is associated with a first dialog task of the plurality of dialog tasks and a second named entity correspondence is associated with a second dialog task of the plurality of dialog tasks;
determining a first named entity set in the to-be-translated sentence and an entity type of each first named entity in the first named entity set, wherein the first named entity set comprises at least one first named entity;
determining, based on the first named entity set, the entity type of each first named entity, and the named entity correspondence, a second named entity set expressed in a second language, wherein the second named entity set comprises at least one second named entity, and the at least one second named entity is corresponding to the at least one first named entity;
determining a source semantic template of the to-be-translated sentence, and obtaining a target semantic template corresponding to the source semantic template from a semantic template correspondence based on the specified dialog task, wherein the semantic template correspondence is a correspondence between a semantic template expressed in the first language and a semantic template expressed in the second language; and
determining a target translation sentence based on the second named entity set and the target semantic template, wherein the target translation sentence is a translated sentence that is expressed in the second language and that is corresponding to the to-be-translated sentence.

14. The computer readable storage medium according to claim 13, wherein determining a second named entity set expressed in a second language comprises:
for each first named entity in the first named entity set, obtaining, based on the entity type of the first named entity, a second named entity corresponding to the first named entity from the named entity correspondence corresponding to the specified dialog task to obtain the second named entity set, wherein the named entity correspondence is a correspondence between a named entity expressed in the first language and a named entity expressed in the second language.

15. The computer readable storage medium according to claim 14, wherein the translation method further comprises:
determining, based on a training corpus corresponding to the specified dialog task, the named entity correspondence corresponding to the specified dialog task, wherein the training corpus comprises at least a training corpus expressed in the first language and a training corpus that is expressed in the second language and that is corresponding to the training corpus expressed in the first language.

16. The computer readable storage medium according to claim 14, wherein translation method further comprises:
when a first named entity in the first named entity set does not exist in the named entity correspondence corresponding to the specified dialog task, obtaining, based on an entity type of the first named entity, a third named entity that is expressed in the second language and that is corresponding to the first named entity; and
updating, based on the entity type of the first named entity, the first named entity, and the third named entity, the named entity correspondence corresponding to the specified dialog task.

17. The computer readable storage medium according to claim 13, wherein the translation method further comprises:
determining, based on a training corpus corresponding to the specified dialog task, the semantic template correspondence corresponding to the specified dialog task, wherein the training corpus comprises at least the training corpus expressed in the first language, and the training corpus that is expressed in the second language and that is corresponding to the training corpus expressed in the first language.

18. The computer readable storage medium according to claim 13, wherein the translation method further comprises:
displaying first semantic information, wherein the first semantic information comprises the first named entity set and the entity type corresponding to each first named entity; and/or displaying second semantic information, wherein the second semantic information comprises the second named entity set and an entity type corresponding to each second named entity.

* * * * *